United States Patent [19]

Ohmura

[11] 4,228,612
[45] Oct. 21, 1980

[54] FISHING EQUIPMENT

[75] Inventor: Ryuichi Ohmura, Shizuoka, Japan

[73] Assignee: Fuji Kogyo Co., Ltd., Shizuoka, Japan

[21] Appl. No.: 938,472

[22] Filed: Aug. 31, 1978

[30] Foreign Application Priority Data

Oct. 18, 1977 [JP] Japan .................... 52-124902

[51] Int. Cl.³ .................... A01K 91/02
[52] U.S. Cl. .................... 43/43.13
[58] Field of Search ............ 43/43.13, 42.37, 42.38, 43/44.9, 42.25, 42.26, 42.21, 42.27, 42.08, 42.28, 42.36, 42.4, 43.2, 43.4

[56] References Cited

U.S. PATENT DOCUMENTS

| 3,121,969 | 2/1964 | Cuttino | 43/42.25 |
| 3,130,516 | 4/1964 | Ballard | 43/43.13 |
| 3,914,895 | 10/1975 | Mize | 43/42.4 |
| 3,964,202 | 6/1976 | Ruppa | 43/42.38 |

Primary Examiner—Othell M. Simpson
Assistant Examiner—Roscoe V. Parker
Attorney, Agent, or Firm—Fleit & Jacobson

[57] ABSTRACT

A fishing equipment in which a main body formed into a shell shape is provided on its outside with three fins along the radial and axial direction, and a bore extending from the top to the bottom of said main body is provided therein. This fishing equipment designed to make various terminal tackles such as lure, practice plug etc.

2 Claims, 3 Drawing Figures

FISHING EQUIPMENT

DETAILED DESCRIPTION OF THE INVENTION

The present invention relates to a fishing equipment used as terminal tackle for a fishing line, and more particularly to a fishing equipment which may be used as an auxiliary means for a terminal tackle such as a fishing lure or may be used for the fabrication of a lure and practice plug.

Preferred embodiments of the present invention will now be illustrated with reference to the drawing in which.

Figure 1:
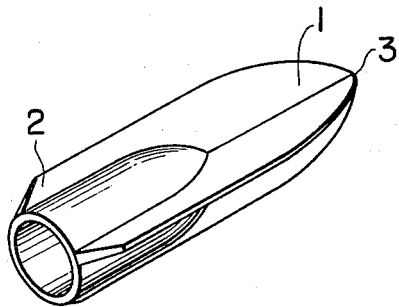
FIG. 1 is a perspective view of one embodiment of the present invention.

Referring now to FIG. 1, numeral 1 denotes a synthetic resin-made main body formed into a shell shape, and is integrally provided on its outside with three radial fins along the axial direction. A through bore 3 is formed on the axis of the main body. Thus constructed fishing equipment, which is attached to a fishing line, serves as an auxiliary means for terminal tackles to exert a floating effect.

Figure 2:
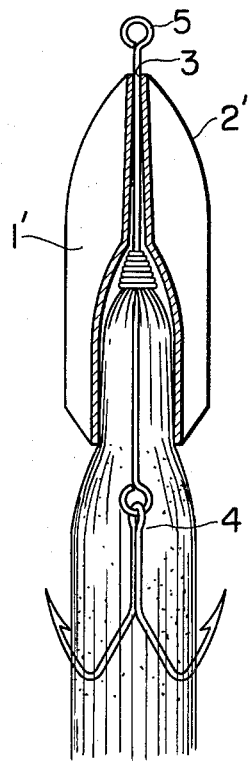
FIG. 2 is a sectional view of the embodiment utilized as a lure.

Referring to FIG. 2, there is shown one example of the embodiment utilized as lure's main body according to the present invention. A feathered or fured wire is inserted from the bottom of a main body 1 into bore thereof. An eye ring (mounting ring) is formed at the upper end of the wire, and a hook is secured to an eye ring (mounting ring) located at the lower end of the wire. This equipment is used as a fishing lure.

Figure 3:
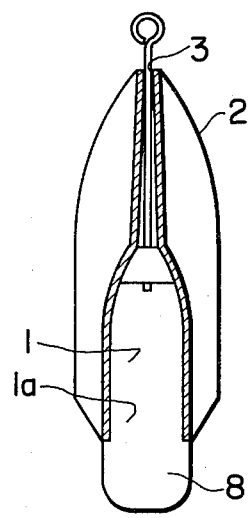
FIG. 3 is a sectional view of the embodiment utilized as practice plug.

Referring to FIG. 3, there is shown another example of the embodiment which is used as a practice plug. According to this embodiment, a swivel is fixed on a top of the body, and a stop plug 8 is inserted into the end 1a of an opening in the bottom of the body. On water this plug is permitted to float on the surface of the water since air cell is formed in the body and on the land this plug is prevented from rotation and entanglement of the line.

While the invention has been described with reference to specific embodiments thereof, it is apparent to one skilled in the art that various modifications and changes can be made therein without departing from the spirit and the scope of the present invention.

What is claimed is:

1. A piece of fishing equipment comprising:
   a hollow main body having a shell shape, an open rear end, and a tapered front end terminating in an opening aligned with an axis of the main body;
   a hollow tapered member formed integral with the main body and extending axially forward therefrom, the tapered member having open front and rear ends cooperating with the main body to define an axially-extending bore;
   a plurality of fins formed integral with and projecting radially outward from the integral main body and tapered member, said fins having substantially straight mid portions, arcuate-shaped leading edge portions extending from the mid portions to portions of the tapered member adjacent the open front end, and trailing edge portions extending at an acute angle from the mid portions to portions of the main body adjacent the open rear end;
   a stop plug inserted into said main body; and
   a swivel connected to the leading end of the tapered member.

2. A piece of fishing equipment according to claim 1, wherein there are three fins.

* * * * *